US012049973B1

(12) United States Patent
Nashed

(10) Patent No.: US 12,049,973 B1
(45) Date of Patent: *Jul. 30, 2024

(54) PIPE CONNECTOR APPARATUS

(71) Applicant: Sedation Systems, LLC, St. Petersburg, FL (US)

(72) Inventor: Ramses S. Nashed, Tierra Verde, FL (US)

(73) Assignee: Sedation Systems, LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,402

(22) Filed: Jun. 16, 2023

Related U.S. Application Data

(63) Continuation of application No. 17/651,710, filed on Feb. 18, 2022, now Pat. No. 11,732,827, which is a continuation-in-part of application No. 17/248,138, filed on Jan. 11, 2021, now Pat. No. 11,313,113.

(60) Provisional application No. 62/995,133, filed on Jan. 14, 2020.

(51) Int. Cl.
*F16L 37/00* (2006.01)
*E03C 1/122* (2006.01)

(52) U.S. Cl.
CPC ............ *F16L 37/008* (2013.01); *E03C 1/122* (2013.01)

(58) Field of Classification Search
CPC ............................... F16L 37/008; E03C 1/122
USPC ........... 4/679, 378, 584, 613, 650, 668, 671; 137/247.41, 362, 577; 285/134.1
See application file for complete search history.

(56) References Cited

U.S. PATENT DOCUMENTS

| | | | | |
|---|---|---|---|---|
| 2,302,617 A | * | 11/1942 | Little .................. | F16L 19/0225 137/247.27 |
| 3,396,752 A | * | 8/1968 | Russell ................... | E03C 1/292 392/479 |
| 3,719,209 A | * | 3/1973 | Rush ..................... | B29D 23/006 4/DIG. 9 |
| 3,994,031 A | * | 11/1976 | Bishop .................... | E03C 1/284 4/679 |
| 4,218,786 A | * | 8/1980 | Taglarino ................ | E03C 1/296 4/DIG. 9 |
| 4,230,582 A | * | 10/1980 | Tuleja .................... | B01D 35/02 4/679 |
| 5,039,135 A | * | 8/1991 | Palmer ..................... | E03F 7/00 285/179 |
| 5,413,705 A | * | 5/1995 | Tammera ............. | B01D 21/265 210/94 |

(Continued)

FOREIGN PATENT DOCUMENTS

| | | | | |
|---|---|---|---|---|
| WO | WO-0188282 A1 | * | 11/2001 | ............. E03C 1/122 |
| WO | WO-2004065703 A1 | * | 8/2004 | ............. E03C 1/282 |

(Continued)

*Primary Examiner* — Lori L Baker
(74) *Attorney, Agent, or Firm* — Nicholas Pfeifer; Smith & Hopen, P.A.

(57) ABSTRACT

A connector apparatus featuring a main pipe with first and second opposed ends. Each has a corresponding male-threaded fastening section for mating with the complimentary female-threaded fastening section on a respective conventional pipe-locking ring or collar. A valve-housing for supporting a one-way flow valve assembly interiorly, and a riser mounted on and supported by the valve housing for ultimate connection to the output or exhaust nozzle of a medical scavenger device.

23 Claims, 16 Drawing Sheets

(56) References Cited

U.S. PATENT DOCUMENTS

| | | | | | |
|---|---|---|---|---|---|
| 5,944,985 | A | * | 8/1999 | Bowman | E03C 1/12 285/125.1 |
| 5,946,747 | A | * | 9/1999 | Geeham | E03D 11/10 4/679 |
| 6,318,397 | B1 | * | 11/2001 | Huber | F16K 15/16 137/856 |
| 6,341,390 | B1 | * | 1/2002 | Lovelace | E03C 1/122 4/679 |
| 6,425,411 | B1 | * | 7/2002 | Gorges | E03C 1/28 4/144.1 |
| 6,651,272 | B2 | * | 11/2003 | Bowman | B01D 61/10 285/132.1 |
| 6,701,965 | B1 | * | 3/2004 | Grace | E03C 1/12 138/112 |
| 6,845,527 | B1 | * | 1/2005 | Kohn | E03C 1/284 4/679 |
| 6,959,723 | B2 | * | 11/2005 | Gorges | E03D 9/00 4/144.1 |
| 7,531,088 | B2 | * | 5/2009 | Gurmu | E03C 1/282 4/291 |
| 7,799,216 | B2 | * | 9/2010 | Gurmu | E03C 1/282 4/291 |
| 10,086,166 | B1 | * | 10/2018 | Nashed | A61M 16/0891 |
| 10,722,674 | B2 | * | 7/2020 | Nashed | A61M 16/0833 |
| 11,313,113 | B1 | * | 4/2022 | Nashed | E03C 1/14 |
| 2002/0189675 | A1 | * | 12/2002 | Huber | E03F 5/08 137/362 |
| 2003/0024568 | A1 | * | 2/2003 | Bowman | B01D 61/10 137/217 |
| 2003/0089397 | A1 | * | 5/2003 | Gorges | E03D 9/00 137/247 |
| 2004/0049846 | A1 | * | 3/2004 | Cornwall | E03F 5/042 4/679 |
| 2005/0268396 | A1 | * | 12/2005 | Wilburn | E03C 1/284 4/679 |
| 2006/0265804 | A1 | * | 11/2006 | Santa Ana | E03C 1/282 4/679 |
| 2007/0011808 | A1 | * | 1/2007 | Park | E03C 1/284 4/679 |
| 2008/0053881 | A1 | * | 3/2008 | Gurmu | E03C 1/282 210/162 |
| 2008/0148477 | A1 | * | 6/2008 | Shafik | F16L 27/1274 4/679 |
| 2009/0045125 | A1 | * | 2/2009 | Gurmu | E03C 1/282 210/311 |
| 2011/0145989 | A1 | * | 6/2011 | Jan | E03C 1/282 4/679 |
| 2012/0192349 | A1 | * | 8/2012 | Torres | A47K 3/006 4/679 |
| 2014/0331404 | A1 | * | 11/2014 | Sumner | E03C 1/28 4/679 |
| 2014/0352047 | A1 | * | 12/2014 | Goldsmith | E03C 1/301 4/301 |
| 2014/0373943 | A1 | * | 12/2014 | Huber | F16K 15/031 137/512 |
| 2015/0013058 | A1 | * | 1/2015 | Bucher | E03D 9/037 4/224 |
| 2016/0002903 | A1 | * | 1/2016 | Grover | E03D 11/08 4/405 |
| 2017/0072156 | A1 | * | 3/2017 | Nashed | A61M 16/0078 |
| 2018/0180205 | A1 | * | 6/2018 | Olson | F16L 27/12 |
| 2019/0153717 | A1 | * | 5/2019 | Jarrar | E03F 3/02 |
| 2020/0370690 | A1 | * | 11/2020 | McAlpine | E03C 1/182 |

FOREIGN PATENT DOCUMENTS

| | | | | |
|---|---|---|---|---|
| WO | WO-2014176605 A1 | * | 10/2014 | A47K 11/12 |
| WO | WO-2019034893 A1 | * | 2/2019 | E03C 1/122 |

* cited by examiner

Coupling a second trap end of a plumbing trap to a first member end of the pipe connector, the plumbing trap having a first trap end opposite the second trap end, the first trap end coupled to the washbasin.

(240)

Coupling the second member end of the pipe connector to the drainpipe, the drainpipe in fluid communication with a waste collection system of the building.

(250)

Coupling an exhaust house in fluid communication with the medical gas scavenging device to the distal end of the valve housing.

(260)

Transferring, via the exhaust house, an amount of the medical waste gas emitted by the medical gas scavenging device into the pipe connector.

(270)

Exhausting, via the drainpipe, the amount of the medical waste gas into the waste collection system of the building.

PIPE CONNECTOR APPARATUS

CROSS-REFERENCE TO RELATED APPLICATIONS

This nonprovisional application is a continuation of and claims priority to U.S. Nonprovisional patent application Ser. No. 17/651,710, entitled "PIPE CONNECTOR APPARATUS," filed Feb. 18, 2022 by the same inventor, which is a continuation-in-part of and claims priority to U.S. Nonprovisional patent application Ser. No. 17/248,138, entitled "PIPE CONNECTOR APPARATUS," filed Jan. 11, 2021 by the same inventor, issued Apr. 26, 2022 as U.S. Pat. No. 11,313,113, and also claims priority to U.S. Provisional Patent Application Ser. No. 62/995,133, entitled "PIPE CONNECTOR APPARATUS," filed Jan. 14, 2020 by the same inventor.

BACKGROUND OF THE INVENTION

1. Field of the Invention

This invention relates, generally, to pipe connector assemblies. More specifically, it relates to a pipe connector apparatus or assembly for connecting the exhaust line of a medical gas scavenging device to a drainpipe in a building or other structure for discharge into the building's wastewater collection system.

2. Brief Description of the Prior Art

It is frequently necessary to vent the exhaust gas emanating from a medical device, such as a gas analgesia machine, outside of the immediate location or treatment room where the medical device is being used. This is currently accomplished by placing a pipe vent in a wall of the treatment room to exhaust the waste gas outside the corresponding building structure. However, when the medical device producing the waste gas is located in an interior room, with no exterior building walls, such a solution becomes impracticable.

To overcome this problem, it is necessary to employ an efficient venting system to remove medical waste gas from interior rooms. Such a venting system includes a connection between the exhaust hose of a medical gas scavenging device to a plumbing fixture drainpipe within a room, such as a sink or washbasin as is common in medical office or building.

Accordingly, what is needed is an in-line pipe connector apparatus capable of discharging an exhalation gas safely and effectively from a treatment room. What is also needed is an in-line pipe connector apparatus that is adaptable to be installed under a conventional washbasin downstream from the trap. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act, or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

An aspect of the present disclosure provides a pipe-connector assembly system for exhausting a waste gas from an interior environment of a building. The pipe-connector assembly system comprises a pipe connector apparatus, which includes, a main pipe member extending between a first member end and a second member end, a valve housing including a proximal end, a distal end, and a valve residing within the valve housing and disposed between the proximal end and the distal end of the valve housing. In embodiments, the proximal end is connected with the main pipe member and the distal end is connected with a gas scavenger device. The systems also comprises a drainpipe having a first end connected with the second member end of the pipe connector apparatus and a second end connected with a waste collection system of the building. In some embodiments, the waste gas flows from the gas scavenger device through the pipe connector apparatus and into the waste collection system of the building, such that the waste gas is safely evacuated from the interior environment.

In embodiments, the pipe-connector assembly system also comprises a quick-release valve having an inlet, an output, and a passage extending between the inlet and the output. The inlet is configured to be removably coupled to an exhaust hose of the gas scavenger device, while the output is connected with the distal end of the valve housing. The waste gas travels from the gas scavenger device through the quick-release valve to the pipe connector apparatus and is exhausted into the waste-collection system of the building.

In embodiments, a riser is disposed between the distal end of the valve housing and the gas scavenger device. The riser includes a body defining a bore extending between a first riser end coupled to the distal end of the valve housing and a second riser end coupled to an exhaust hose of the gas scavenger device. The riser is fluidly connected with the main pipe member and the gas scavenger device.

In embodiments, pipe-connector assembly system also comprises a plumbing trap. The plumbing trap includes a first trap end and a second trap end. The first trap end is configured to be connected with a washbasin disposed within the interior environment. Accordingly, a first attachment mechanism is disposed at the first member end and configured to threadedly engage with a second attachment mechanism disposed at the second trap end of the plumbing trap. In addition, a third attachment mechanism is disposed at the second member end and configured to threadedly engage with the first end of the drainpipe, such that the pipe connector apparatus is secured between the plumbing trap and the drainpipe.

In embodiments, the valve is a one-way valve, such that that the backflow of the waste gas from the waste collection system back into the internal environment is prevented. In embodiments, the valve further includes a closed position and an open position, where the open position permits the waste gas to flow through the valve housing from the internal environment to the waste collection system of the building. In the closed position, the valve prevents the backflow of the waste gas from the waste collection system back into the internal environment. In embodiments the valve comprises of a biasing component that applies a biasing force on a rigid portion towards the closed position. The rigid portion is translatable between the closed position and the open position when an external force, emanating from the gas scavenger device, overcomes the biasing force. In embodiments, the waste gas is a medical waste gas generated by an analgesic system fluidly connected with the gas scavenger system. In some embodiments, the waste gas comprises a mixture of nitrous oxide and oxygen.

In another aspect, the present disclosure provides a pipe-connector assembly system for exhausting a medical waste gas from a treatment room within a building. The pipe-connector assembly system comprises a pipe connector apparatus, which includes, a main pipe member extending between a first member end and a second member end, the first member end connected with the second trap end, a valve housing including a proximal end, a distal end, and a one-way valve residing within the valve housing and disposed between the proximal end and the distal end of the valve housing. The proximal end is connected with the main pipe member and the distal end is connected with a medical gas scavenger device. The one-way valve is configured to be translatable between an open position, which is configured to permit the flow of the medical waste gas through the valve housing, and a closed position, which is configured to prevent the flow of the medical waste gas through the valve housing. The one-way value is biased towards the closed position. The pipe-connector assembly system also comprises a drainpipe having a first end connected with the second member end of the pipe connector apparatus and a second end connected with a waste collection system of the building. In some embodiments, the medical waste gas flows from the medical gas scavenger device through the pipe connector apparatus and into the waste collection system of the building, such that the medical waste gas is safely evacuated from the treatment room.

In embodiments, the pipe-connector assembly system includes a quick-release valve which has an inlet, an output, and a passage that extends between the inlet and the output. The inlet is configured to be removably coupled to an exhaust hose of the medical gas scavenger device, and the output is connected with the distal end of the valve housing, allowing the medical waste gas to travel from the medical gas scavenger device through the quick-release valve to the pipe connector apparatus and exhausted into the waste-collection system of the building.

In embodiments, a riser is disposed between the distal end of the valve housing and the medical gas scavenger device. The riser includes a body defining a bore extending between a first riser end coupled to the distal end of the valve housing and a second riser end coupled to an exhaust hose of the medical gas scavenger device. The riser is fluidly connected with the main pipe member and the medical gas scavenger device.

In embodiments, pipe-connector assembly system also comprises a plumbing trap. The plumbing trap includes a first trap end and a second trap end. The first trap end is configured to be connected with a washbasin disposed within the interior environment. Accordingly, a first attachment mechanism is disposed at the first member end and configured to threadedly engage with a second attachment mechanism disposed at the second trap end of the plumbing trap. In addition, a third attachment mechanism is disposed at the second member end and configured to threadedly engage with the first end of the drainpipe, such that the pipe connector apparatus is secured between the plumbing trap and the drainpipe.

In embodiments, the medical waste gas comprises a mixture of nitrous oxide and oxygen. In embodiments, a biasing component applies a biasing force on a rigid portion towards the closed position, preventing the flow of the medical waste gas within the valve assembly. The rigid portion is translatable between the closed position and the open position when an external force, emanating from the gas scavenger device, overcomes the biasing force.

In embodiments, the valve housing includes an interior wall, extending between the proximal end and the distal end. A channel is defined by the interior wall. The valve housing also includes a support floor member disposed within the channel. The support floor member comprises a central hub, which has a central valve-step support aperture and a rib extending radially between the central hub and the interior wall of the channel.

In another aspect, the present disclosure provides a method of exhausting a medical waste gas scavenged by a medical gas scavenging device from a treatment room in a building. The method comprises (a) coupling a second member end of a pipe connector apparatus to a drainpipe, the drainpipe fluidly connected with a waste collection system of the building; (b) coupling an exhaust hose fluidly connected with the medical gas scavenging device to the distal end of the valve housing; (c) collecting, via the medical gas scavenging device, an amount of the medical waste gas emitted; (d) transferring, via the exhaust hose, an amount of the medical waste gas emitted by the medical gas scavenging device into the pipe connector; and (e) exhausting, via the drainpipe, the amount of the medical waste gas into the waste collection system of the building.

In embodiments, the pipe connector apparatus includes a second member end opposite the first member end and a main pipe member extending therebetween, a valve housing including a proximal end opposite a distal end, and a valve residing within the valve housing and disposed between the proximal end and the distal end. The valve housing extends orthogonally away from the main pipe member between the first member end and the second member end.

In embodiments, the steps of the method of the present disclosure include providing a quick release valve, where the quick release valve has an inlet, an output, and a passage extending between the inlet and the output. The method also includes coupling the inlet to the exhaust hose of the medical gas scavenger device; coupling the outlet to the distal end of the valve housing; and transferring, via the quick-release valve, the medical waste gas from the medical gas scavenging device to the pipe connector apparatus.

In embodiments, the steps of the method also include identifying the drainpipe disposed between the medical scavenging device and waste collection system of the building; placing a cutting device onto the drainpipe, where the cutting device is configured to cut the drainpipe into a first section and a second section; operating the cutting device, such that the cutting device cuts the drainpipe into the first section and the second section; and installing the pipe connector apparatus between the first section and the second section, such that the first member end of the pipe connector is connected with the first section, and such that the second member end of the pipe connector apparatus is connected with the second section. The pipe connector apparatus is connected with the medical scavenging device and the waste collection system of the building.

These and other important objects, advantages, and features of the invention will become clear as this disclosure proceeds.

The invention accordingly comprises the features of construction, combination of elements, and arrangement of parts that will be exemplified in the disclosure set forth hereinafter, and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
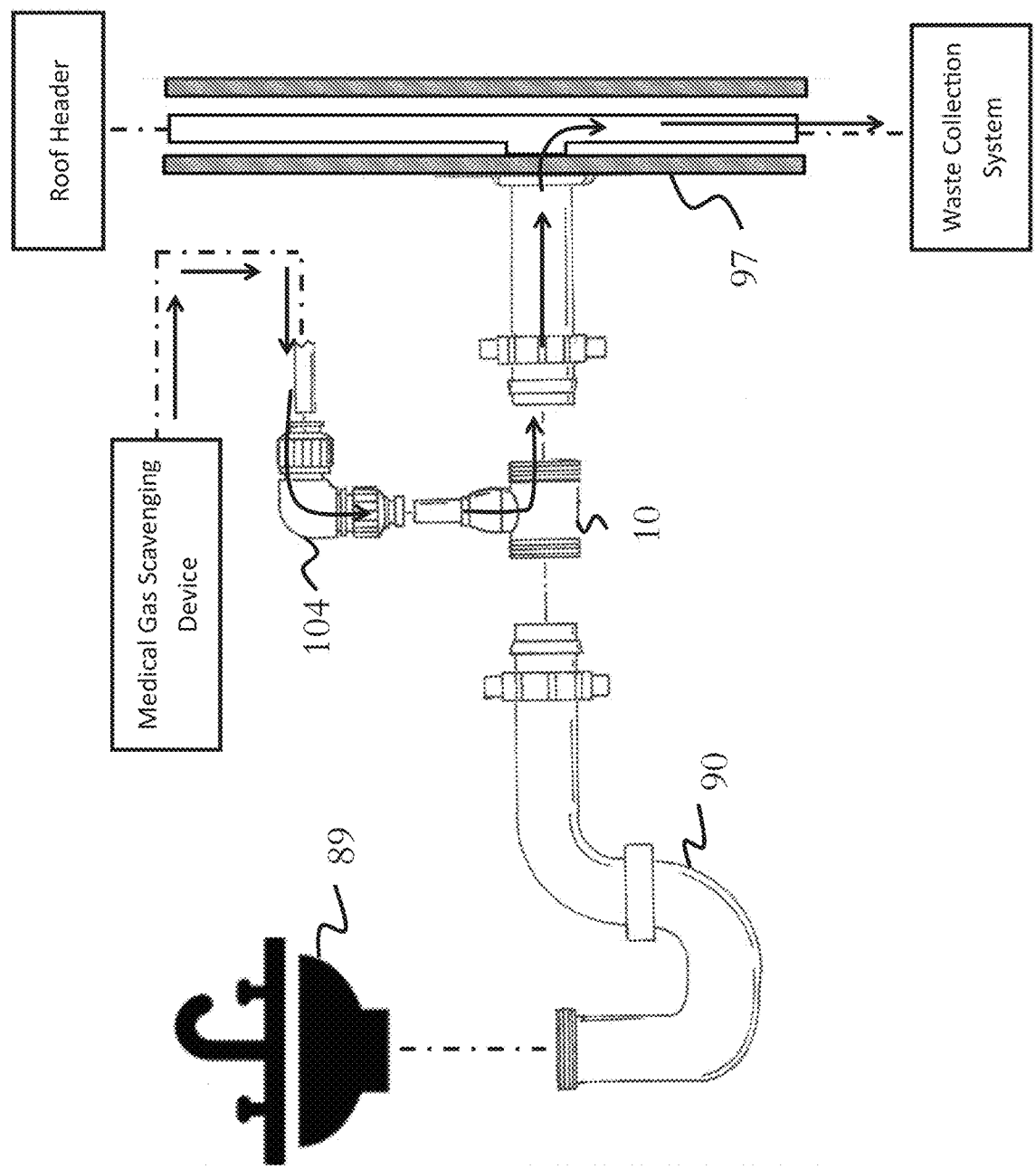
FIG. 1 is a schematic view of an embodiment of the pipe connector apparatus of the present invention in fluid communication with an analgesia system according to embodiments of the present disclosure.
Figure 2:
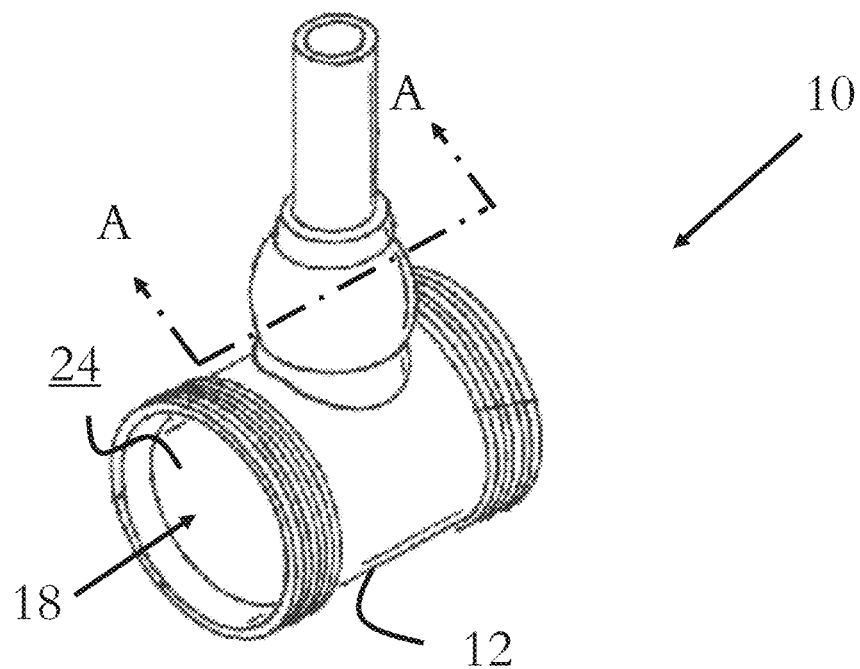
FIG. 2 is a perspective view of an embodiment of the pipe connector apparatus of the present invention according to embodiments of the present disclosure.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

Elements/components shown in diagrams are illustrative of exemplary embodiments of the disclosure and are meant to avoid obscuring the disclosure. Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in other embodiments" or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Any headings used herein are for organizational purposes only and shall not be used to limit the scope of the description or the claims. Furthermore, the use of certain terms in various places in the specification of for illustration and should not be construed as limiting.

As used in this specification and the appended claims, whenever the term "at least," "greater than," or "greater than or equal to" precedes the first numerical value in a series of two or more numerical values, the term "at least," "greater than," or "greater than or equal to" applies to each of the numerical values in that series of numerical values. For example, greater than or equal to 1, 2, or 3 is equivalent to greater than or equal to 1, greater than or equal to 2, or greater than or equal to 3.

As used in this specification and the appended claims, whenever the term "no more than," "less than" or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a simple, compact, and inexpensive connector assembly which easily may be installed in a drainpipe of a washbasin without impairing the operation of the plumbing trap, such as a P-trap, within the corresponding washbasin. The unitary in-line pipe connector assembly (alternatively referred to as "pipe connector apparatus") includes a main pipe member having first and second opposed ends. Each end includes a corresponding male-threaded fastening section for mating with a complementary female-threaded fastening section on a respective conventional pipe-locking ring or collar. In addition, each end includes a valve-housing for supporting an interior one-way flow valve assembly, as well as a riser mounted on and supported by the valve housing for ultimate connection to the output or exhaust nozzle of a medical scavenger or evacuation device.

In use, a section of the drainpipe proximal to output side of the plumbing trap is removed, and the connector apparatus of the invention is lockingly sealed into place in the drainpipe in place of the removed section. The scavenger exhaust nozzle is then connected to the riser on the connector apparatus valve housing. Exhaust gas from the scavenger flows through the one-way valve into the building waste drainage system. The unitary in-line pipe connector assembly prevents the back-flowing of the gas from the waste system by the blocking action of the one-way valve.

Turning initially to FIGS. 1-17, unitary in-line pipe connector assembly 10 (hereinafter "pipe connector apparatus 10") comprises three primary components: main pipe member 12, valve housing 14, and riser 16 extending upwardly away from valve housing portion 14.

Main Pipe Member

Main pipe member 12 is cylindrically shaped, defining a hollow bore or central passage 18 extending between first peripheral end edge 20 and second peripheral edge 22, such that central passage 18 is formed throughout main pipe member 12. As such, first peripheral end edge 20 defines first opening 21, and second peripheral end edge 22 defines second opening 23, such that central passage 18 is formed throughout main pipe member 12.

Figure 3:
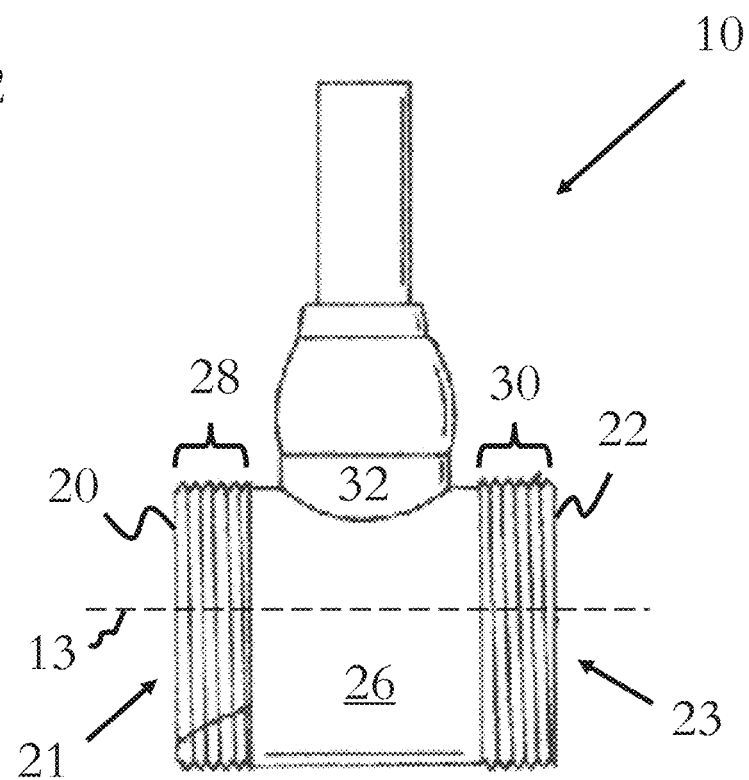
FIG. 3 is a side view of an embodiment of the pipe connector apparatus of FIG. 2 according to embodiments of the present disclosure.
Figure 4:
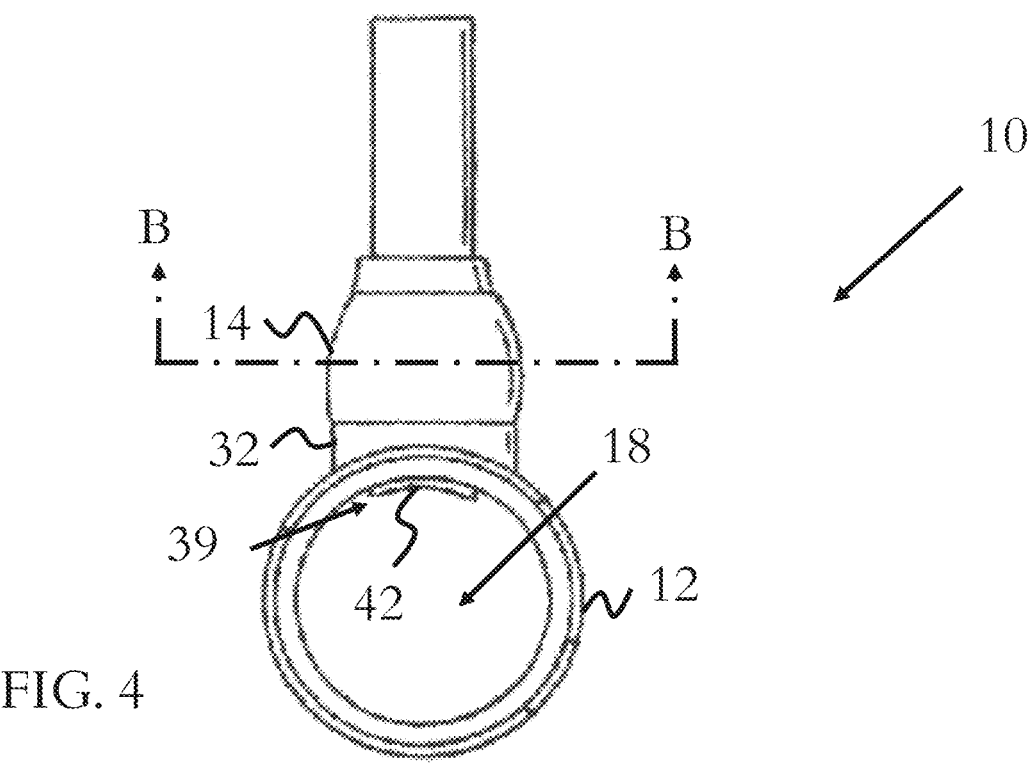
FIG. 4 is a side view of an embodiment of the pipe connector apparatus of FIG. 2 according to embodiments of the present disclosure.
Figure 5:
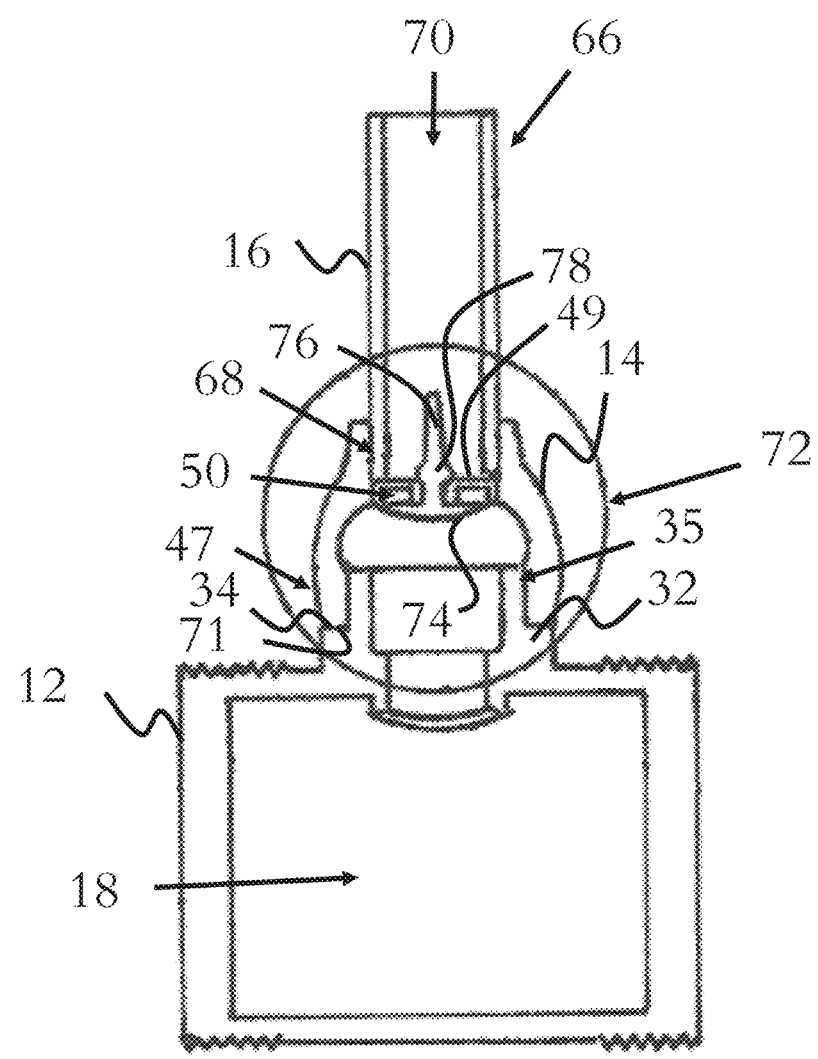
FIG. 5 is a top plan view of an embodiment of the pipe connector apparatus of FIG. 2 according to embodiments of the present disclosure.

Additionally, main pipe member 12 includes continuous interior wall surface 24 that may be substantially cylindrical and smooth, such that interior wall surface 24 is free from projections or unevenness. In contrast, exterior surface 26 of main pipe member 12 includes first and second spiral fastening sections 28, 30, which may be male-threaded fastening sections, as shown in FIG. 3. As will be described in greater detail below, first and second spiral male-threaded fastening sections 28, 30 mechanically couple with a corresponding complementary spiral female-threaded sections of conventional drainpipe locking rings or collars. In an embodiment, fastening sections 28, 30 may be any fastening means, such that main pipe member 12 is mechanically coupled with a corresponding complementary fastening section of conventional drainpipe locking rings or collars.

Referring to FIGS. 2-9, main pipe member 12 includes valve-housing mounting base 32 (alternatively referred to as "support boss 32") extending orthogonally with respect to central longitudinal axis 13 of main pipe member 12. In an embodiment, support boss 32 is monolithically formed with main pipe member 12. In yet another embodiment, support boss 32 is formed of a separate piece, such that support boss 32 is coupled with main pipe member 12 during the installation or assembly of pipe connector apparatus 10 (e.g., such as when pipe connector apparatus 10 is installed with an existing waste-collection system of a building).

Support boss 32 includes support boss body 33 extending from first boss end 35 to second boss end 39. Formed within a portion of support boss body 33, peripheral support end edge 34 resides between first boss end 35 and second boss end 39. Peripheral support edge 34 is configured to receive lower portion 47 of valve housing 14, which will be discussed in greater detail below.

Additionally, support boss 32 includes passageway 37 in fluid communication with central passage 18 of main pipe member 12. Passageway 37 includes first passage 38 and second passage 40. First passage 38 is defined by first interior wall 43, and second passage 40 is defined by second interior wall 41. First interior wall 43 has a greater width (or diameter) than second interior wall 41. In an embodiment, first interior wall 43 has a width (or diameter) equal to or less than second interior wall 41.

In an embodiment, annular abutment 42 of second boss end 39 extends at least partially within central passage 18 of main pipe member 12. The partial protrusion of annular abutment 42 into central passage 18 serves as an axial stop member to limit the insertion of end edges 96, 98 (see FIG. 10) longitudinally into central passage 18 when installed with the waste system of the building. In other words, annular abutment 42 prevents one or both of end edges 96, 98 from being disposed within central passage 18 in such a manner that the flow of the fluid from riser 16 to central-passage 18 is restricted or prevented entirely. In an embodiment, the fluid is a medical waste gas, an exhalation gas, waste gas, sewer gas, or any other undesired gas or liquid that a user wishes to exhaust from an environment with the user. In such an embodiment, the environment may be a medical treatment room, storage room, laboratory, or any other confined space that a user seeks to exhaust the fluid from.

Riser

Figure 6:
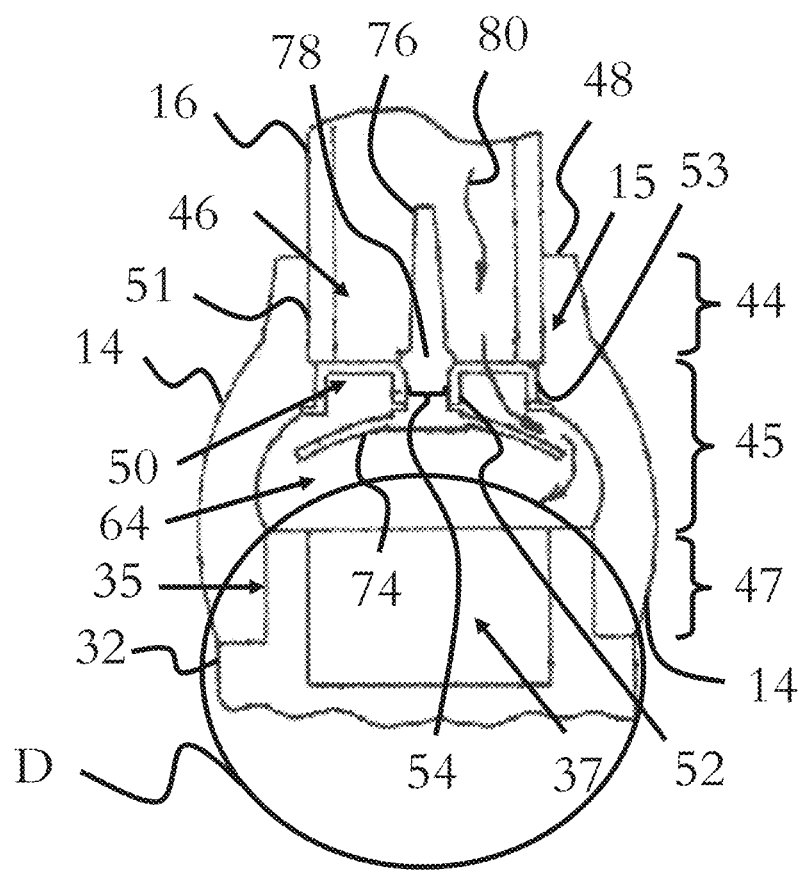
FIG. 6 is a cross-sectional view of an embodiment of the pipe connector apparatus of FIG. 5 taken along line C-C according to embodiments of the present disclosure.
Figure 7:
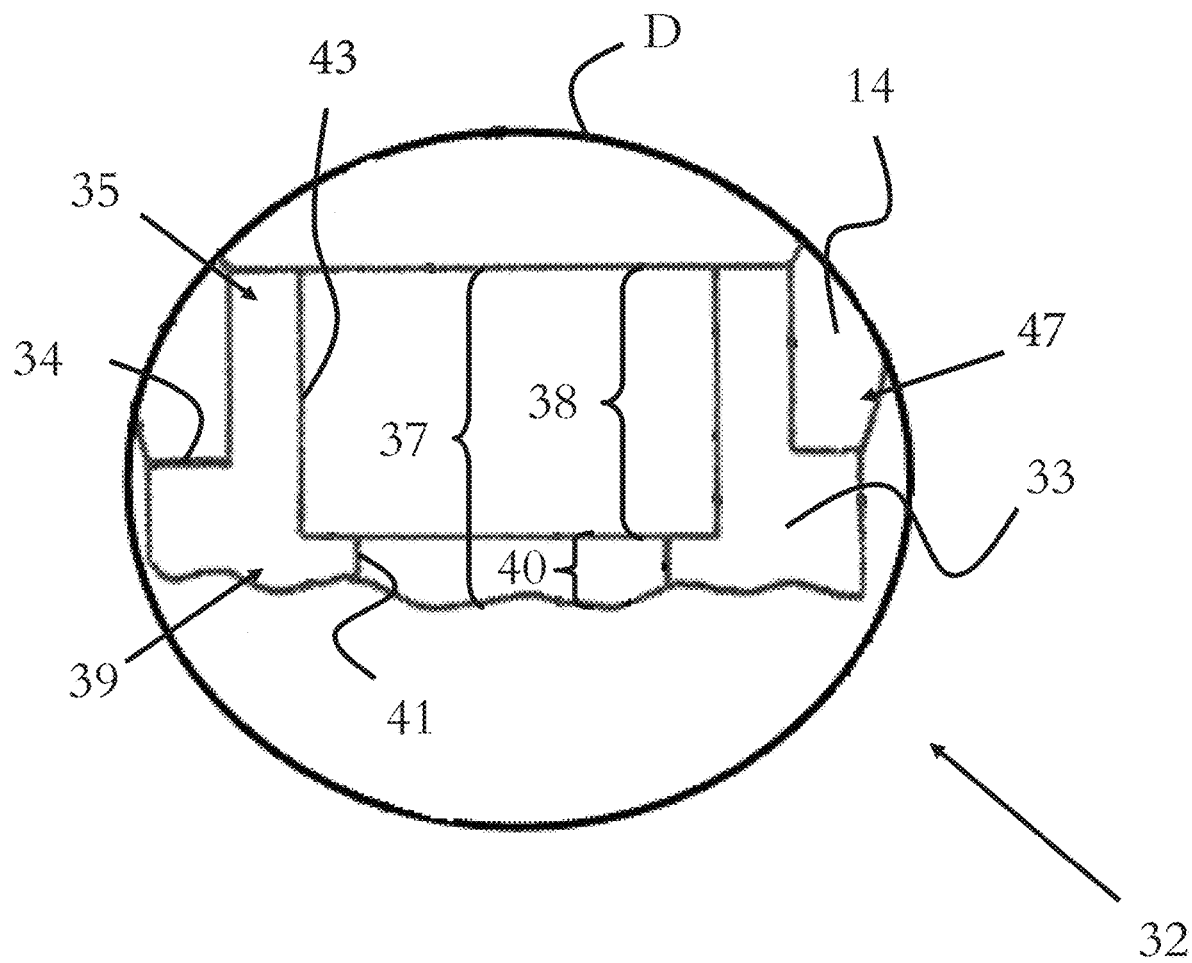
FIG. 7 is a cross-sectional view Detail E of FIG. 6 according to embodiments of the present disclosure.
Figure 8:
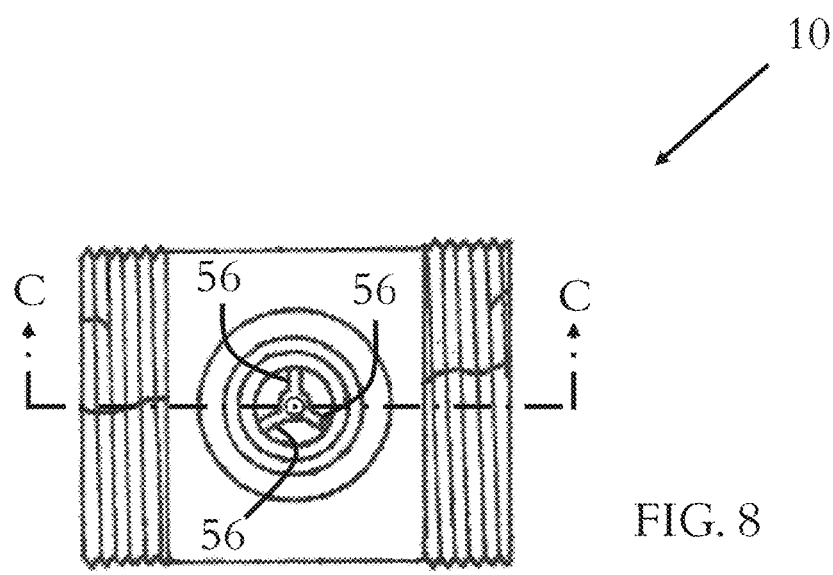
FIG. 8 is an enlarged view of the pipe connector apparatus of FIG. 7, particularly showing the circled portion D, depicting the valve in an open position according to embodiments of the present disclosure.
Figure 9:
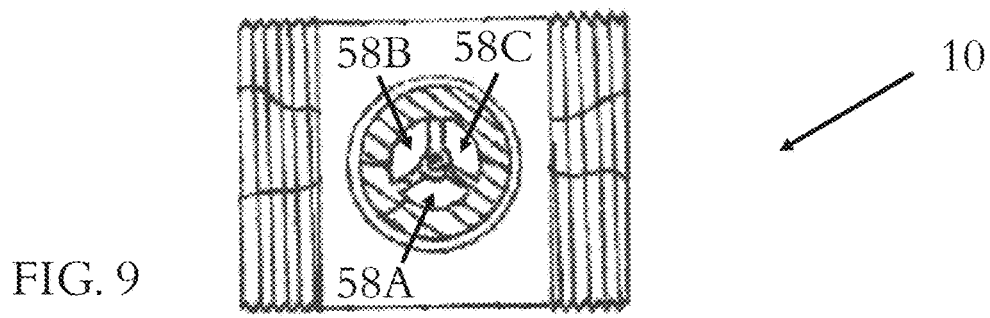
FIG. 9 is a top cross-sectional view of an embodiment of the pipe connector apparatus taken along line B-B of FIG. 4 according to embodiments of the present disclosure.

As depicted in FIGS. 6 and 7, riser 16 is preferably comprised of a hollow tubular structure having top-end edge 66 and opposed bottom end edge 68 defining central passage 70 extending therethrough. Bottom end edge 68 is configured to be disposed adjacent to top outer circumferential surface 49 of riser-support flow member 50 of valve-housing 14. Furthermore, top-end edge 66 of riser 16 is in mechanical communication with the environment of the building where the fluid is being exhausted (or removed) from. In an embodiment, top-end edge 66 is mechanically coupled to a medical gas scavenging device's exhaust nozzle. In such embodiments, the medical gas scavenging device facilitates the flow of the fluid from the environment, through pipe connector apparatus 10, and ultimately into the building's waste-collection system.

Valve Housing

Referring now to FIGS. 6-9, valve-housing 14 controls the fluid flow between riser 16 and passageway 37 via valve assembly 72 disposed within cavity 64. Specifically, valve-housing 14 prevents the fluid's backflow through pipe connector apparatus 10, through riser 16, and ultimately back into the environment with the user.

Valve-housing 14 includes upper portion 44, central portion 45, and lower portion 47. Upper portion 44 of valve-housing 14 is preferably tapered and terminates distally, forming receipt 46 for receiving bottom portion 15 of riser 16. Receipt 46 is defined by first internal wall 51 extending from top peripheral end edge 48 of tapered valve-housing upper portion 44 downwardly to riser-support floor member-generally denoted as reference numeral 50. Riser floor member 50 abuts a portion of second internal wall 53 of central portion 45 of valve-housing portion 14, thereby forming cavity 64 extending between riser floor member 50 and first boss end 35 of support boss 32. Furthermore, riser floor member 50 includes central hub 52 defining central valve-step support opening 54. At least one rib 56 extends radially between hub 52 and upper portion 44 of valve-housing forming passage 58. In an embodiment, three equidistantly spaced-apart ribs 56 extend radially between hub 52 and upper portion 44 of valve-housing 14, thereby forming passages 58A, 58B, and 58C (collectively referred to as passages 58). Lower portion 47 of valve-housing 14 is slidably disposed over and positioned adjacent to first boss end 35. In such configurations, peripheral support edge 34 abuts terminal edge 71 support boss 32.

As noted above, valve assembly 72 regulates the fluid flow between riser 16 and central passage 18 of main pipe member 12. The regulation of the fluid flow may be achieved by transitioning flexible (or umbrella) portion 74 between a closed position (see FIG. 6) and an open position (see FIG. 7, which shows circled portion D of FIG. 6). In particular, flexible portion 74 is integrally mounted on supporting spindle 76. Fastening enlargement or nub 78 is provided on spindle 76 and is spaced apart from flexible portion 74. Nub 78 is sized to enable spindle 76 to be press-fit into and through central support opening 54 in floor member 50. By doing so, valve assembly 72 is locked in place and supported by floor member 50 in an operational position (e.g., open or closed position), as shown in FIGS. 6 and 7.

In an embodiment, valve assembly 72 is biased toward the closed position, such that flexible portion 74 is concave (see FIG. 6). Accordingly, when valve assembly 72 is in the closed position, the concave nature of flexible portion 74 completely seals off passages 58 from being in fluid communication with cavity 64. Thus, the backflow of any fluid back into riser 16 is prevented.

Alternatively, when flexible portion 74 is acted upon by the force of a fluid (such as flowing gas from a medical gas scavenging device) traveling through central passage 70 of riser 16, flexible portion 74 flexes and assumes the open position having a convex shape (see FIG. 7). In such open positions, any gas or other fluid flowing through riser 16 will continue to flow as indicated by arrows 80 through passages 58. The fluid then flows into cavity 64 and through passageway 37. Lastly, the fluid exits into central passage 18 of main pipe member 12, where the fluid can be safely discharged into the building's waste-collection system.

Thus, by providing valve assembly 72 in accordance with the present invention, the pipe connector apparatus 10 of FIGS. 2-9 is capable only of uni-directional exhaust flow. Accordingly, any backflow of an undesirable fluid (e.g., sewer gas) into the treatment room or area that may emanate from the building's waste-collection system to which pipe connector apparatus 10 is connected is eliminated by the present invention.

Figure 10:
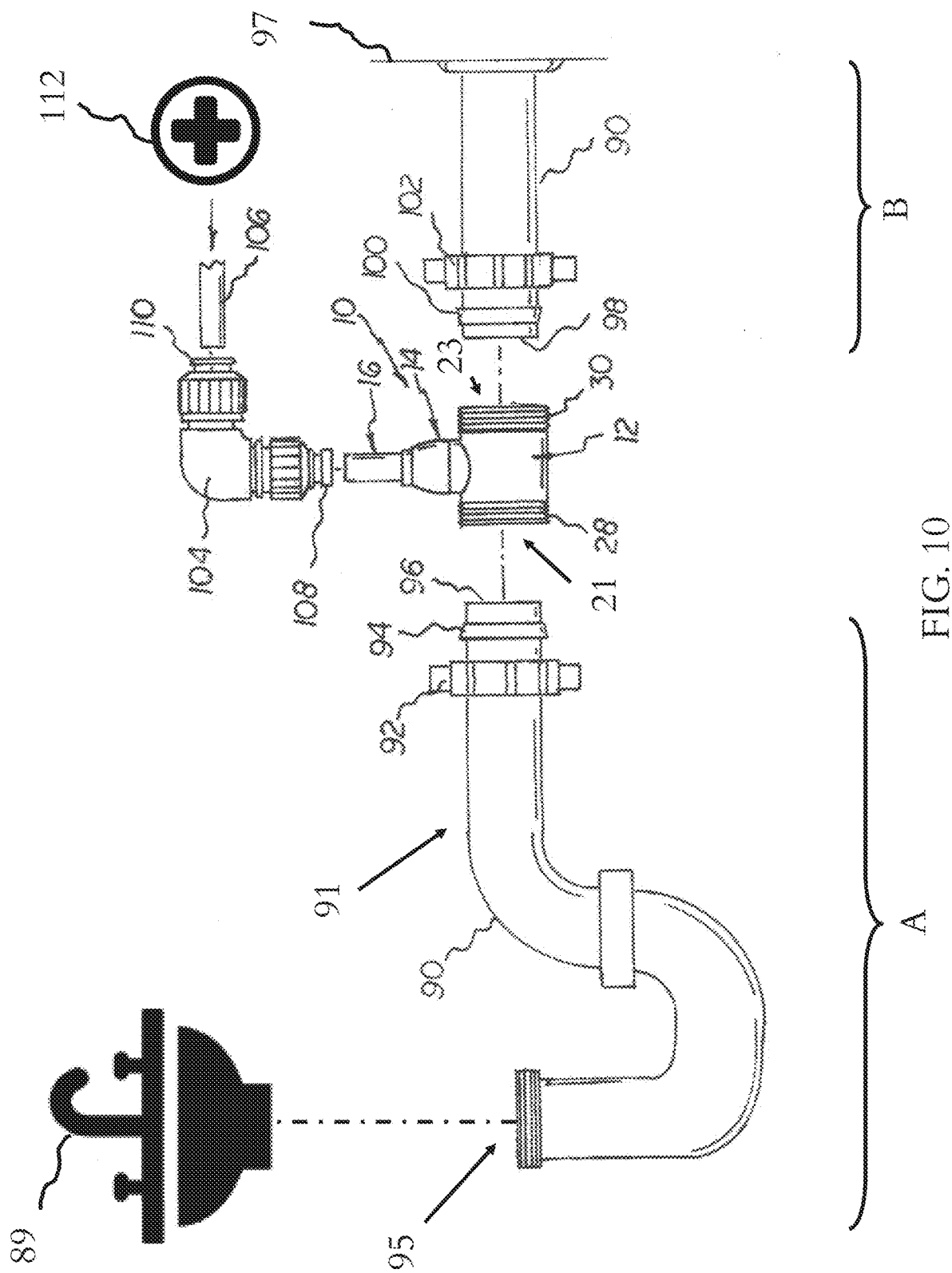
FIG. 10 is an exploded assembly view of an embodiment of the pipe connector apparatus of the present invention in association with a conventional trap and drainpipe set up according to embodiments of the present disclosure.

Turning now to FIG. 10, an exploded view of an in-use embodiment is shown. Specifically, drainpipe 90, such as a plumber trap commonly employed underneath a sink or washbasin 89, mechanically couples to pipe connector apparatus 10 via straight section 91 that is disposed between output 95 and adjacent wall 97. In particular, connector 10 is installed in the position between longitudinally separated sections A, B of drainpipe 90; for example, a narrow portion of drainpipe 90 can be removed, thereby leaving exposed end edges 96 and 98, respectively. Next, drainpipe locking rings 92 and 102, and their respective retainer rings 94 and 100, are placed on the separated drainpipe sections A, B. From there, cut end edges 96, 98 are inserted into their corresponding first pipe opening 21 and section pipe opening 23 of main pipe member 12. Once inserted into central passage 18, locking rings 92, 102 are rotated to mechanically engage male-threaded sections 28, 30 in a tightened, sealed arrangement.

Additionally, quick-release elbow connector 104 having opposed inlet 110 and output 108 ends is coupled to exhaust hose 106 of medical gas scavenger device 112. Elbow output 108 is then releasably coupled to riser 16. Thus, any gas, or a mixture of gas, being exhausted through hose 106 by gas scavenger device 112 (as indicated by the arrow) flows through connector 10, into central passage 18, and out through second pipe opening 23 of main pipe member 12, into exhaust riser 114 located behind wall 97 (see FIG. 1), and ultimately into the waste-collecting system of the building structure.

Since the gas flowing through connector 10 nominally will be at atmospheric pressure, there is no tendency of the gas to disturb, or remove, or otherwise affect in any way the water column in drainpipe 90. Specifically, the water column prevents any gas from the building's waste collection system from back-flowing through the sink drain into the room where the sink is located. And, by the same token, in accordance with the present invention, one-way valve assembly 72 in connector 10 prevents the backflow of any such gas through riser 16.

Figure 11:
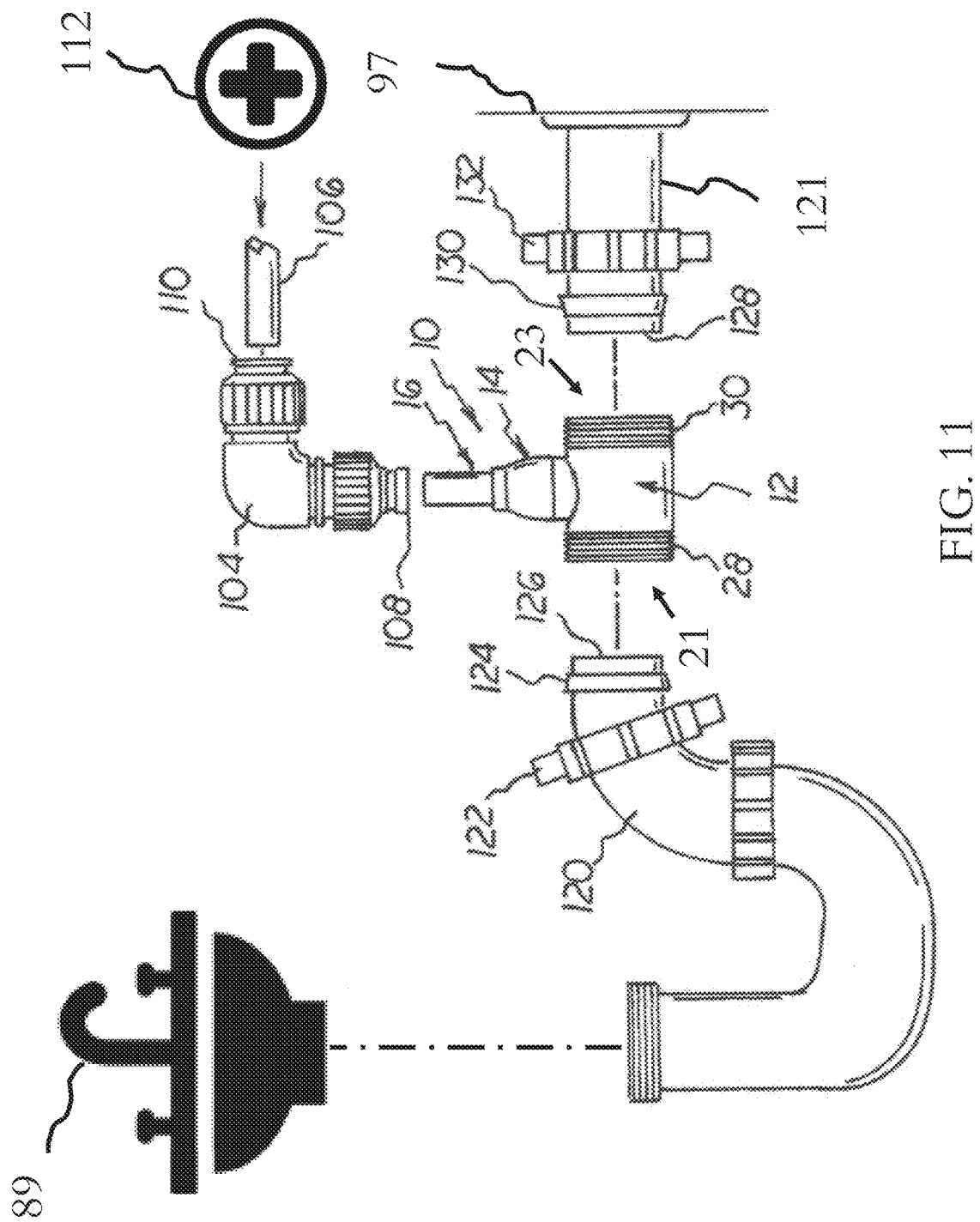
FIG. 11 is an exploded assembly view of an embodiment of the pipe connector apparatus of the present invention in association with an embodiment of a conventional trap and drainpipe set up according to embodiments of the present disclosure.

Turning to FIG. 11, an alternative assembly is shown, including reversing elbow 120 that replaces drainpipe 90. Reversing elbow 120 includes end edge 126, second locking ring 122, the corresponding retainer ring 124, and shortened straight section 121 of drainpipe 120 adjacent to the depicted wall. When reversing elbow 120 is employed as depicted in FIG. 11, only one cut (i.e., a single cut) needs be made to drainpipe straight section 121. Once the cut is made, end edge 128 is inserted into section pipe opening 21 of main pipe member 12. Next, lock ring 132 and retainer ring 130 are disposed on drainpipe 90. Next, end edge 126 of reversing elbow 120 is disposed within first pipe opening 23 of in-line pipe connector apparatus 10. Locking rings 122, 123 are then tightened onto threaded end sections 28, 30 of main pipe member 12. In such embodiments, such installation of pipe connector 10 is suitable where washbasin 89 is located near an adjoining wall, where space underneath washbasin 89 is limited or a minimum amount of cutting (i.e., removing) of a portion of drainpipe 90 is desired.

The components of the present invention can be made from inexpensive, durable molded plastic materials. Fabrication of the pipe connector apparatus 10 of the present invention is relatively easy and therefore inexpensive. In an embodiment, valve assembly 72 can be joined to valve housing 14. By inserting spindle 76 into central opening 54 of hub 52, valve housing 14 can be joined as by suitable gluing to support boss 32 of main pipe member 12. Finally, riser 16 can be joined in place at the bottom of recess 46 (again as by suitable gluing).

From the foregoing, it will be apparent that the pipe connector apparatus 10 of the present invention is suitable for advantageous use in a wide variety of applications. One such application, mentioned by way of example, and merely as illustrative and not to be construed as limiting, is to provide a convenient, effective, and safe means for removing the exhaled waste gas of a patient breathing a mixture of nitrous oxide and oxygen during a medical procedure being performed in a treatment room via an analgesia system, such as that commercially distributed by Sedation Systems LLC, St. Petersburg, FL, under the Nitrouseal® trademark. An embodiment of the Nitrouseal® analgesia system is disclosed in U.S. Pat. No. 8,826,905 B2, entitled "Respiratory Face Mask and Breathing Circuit Assembly," which is hereby incorporated by reference in its entirety. By further way of example, in the aforementioned Nitrouseal® analgesia system, a Miniscav® portable waste gas evacuation pump manufactured by RA Medical Svcs., Ltd., Steeton, England may be used as the "scavenger" or "vacuum" to remove expired waste gas from the treatment area where the equipment is being used.

Piston-Valve Pipe Member

Figure 12:
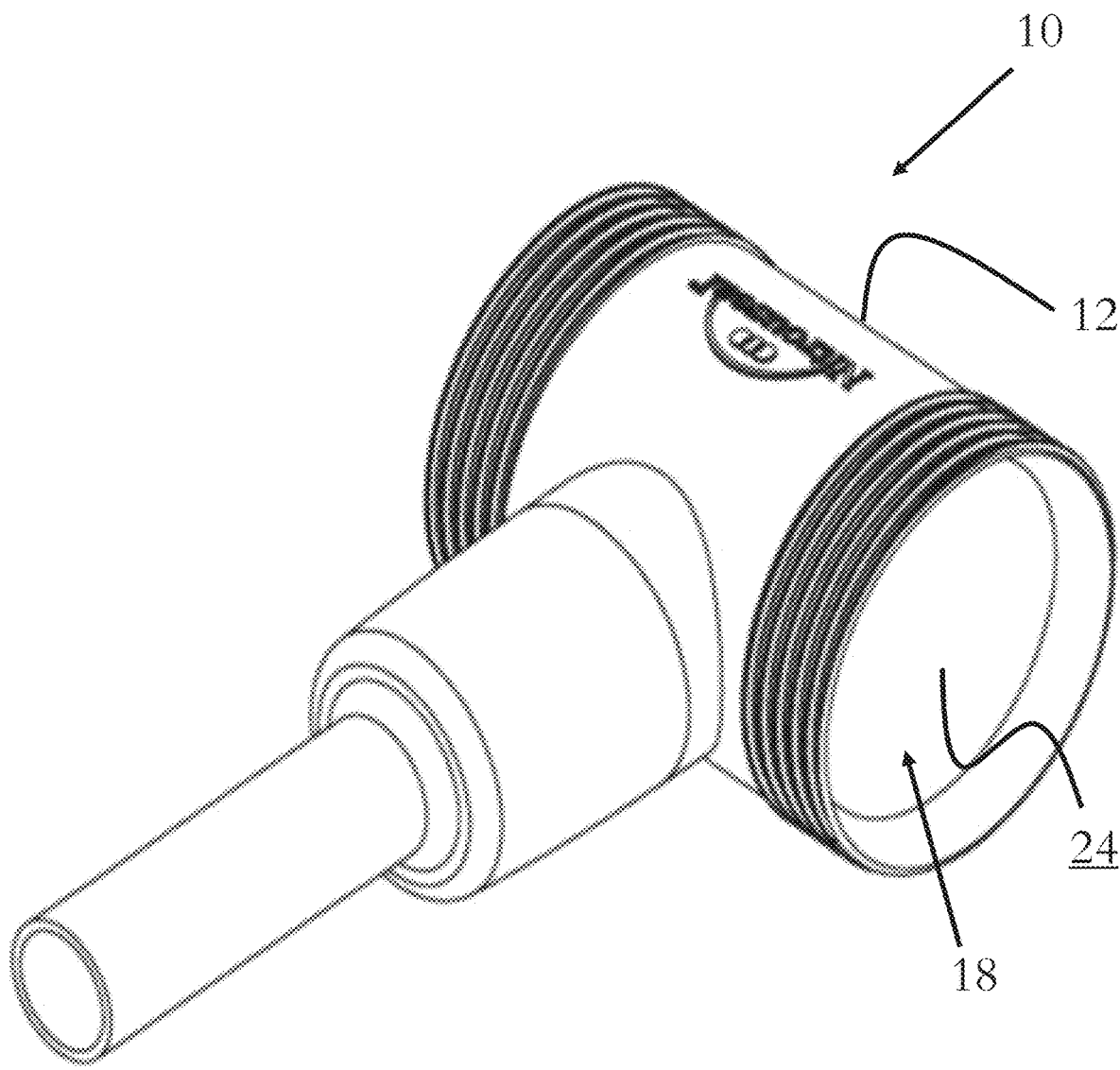
FIG. 12. is a perspective view of an embodiment of the pipe connector apparatus of the present invention according to embodiments of the present disclosure.
Figure 13:
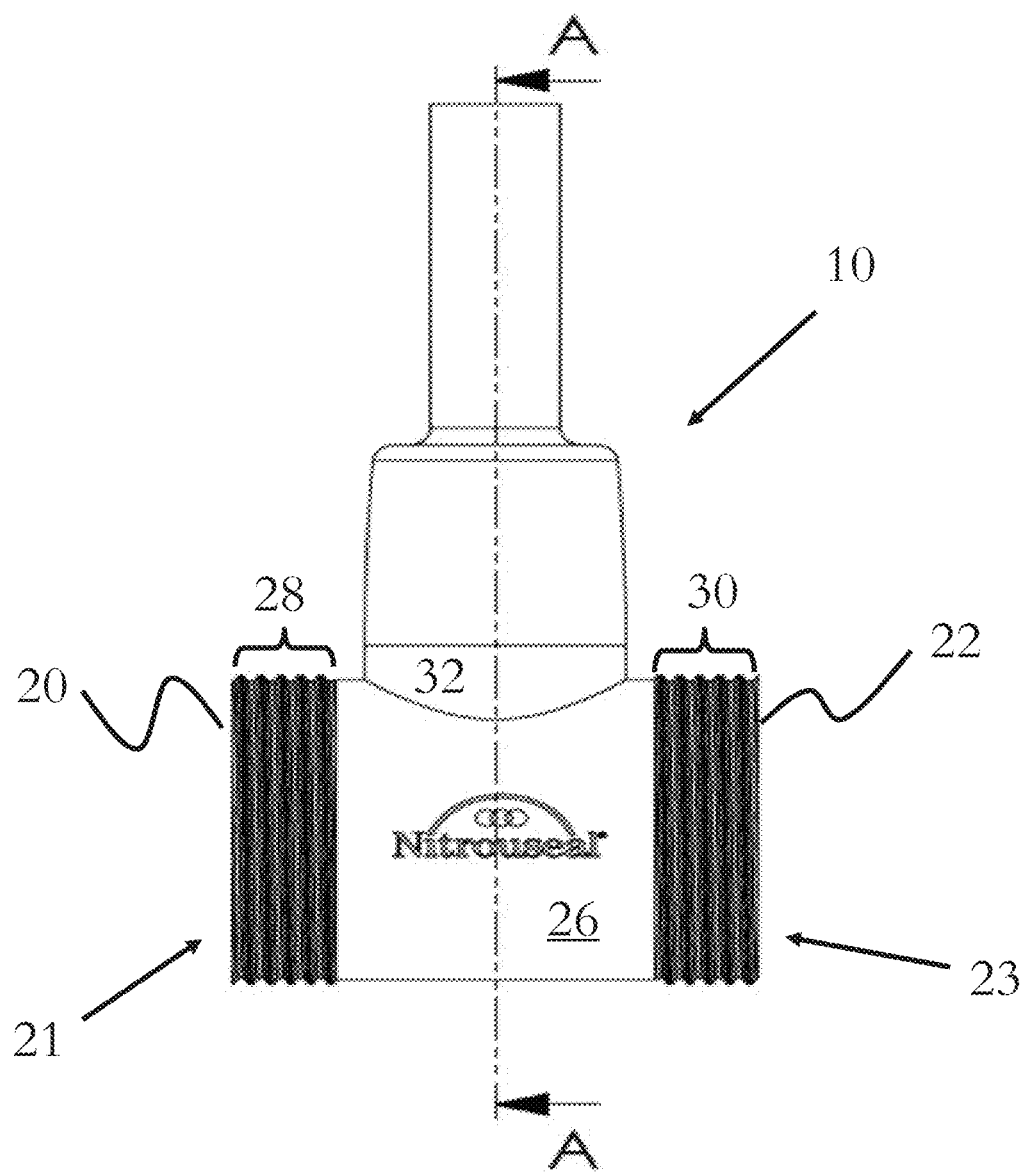
FIG. 13 is a perspective view of an embodiment of the pipe connector apparatus of the present invention according to embodiments of the present disclosure.

FIGS. 12-16 depict pipe connector apparatus 10, having main pipe member 12, valve housing 14, and riser 16, extending upwardly away from valve housing portion 14, according to embodiments of the present disclosure. As shown in FIGS. 12-13, main pipe member 12 may be cylindrically shaped, defined by a hollow bore or central passage 18 extending between first peripheral end edge 20 and second peripheral edge 22, such that central passage 18 may be formed throughout main pipe member 12. In embodiments, first peripheral end edge 20 may define first opening 21, and second peripheral end edge 22 may define second opening 23, such that central passage 18 may be formed throughout main pipe member 12.

Additionally, As depicted in FIGS. 12-13, main pipe member 12 includes continuous interior wall surface 24 that may be substantially cylindrical and smooth, such that interior wall surface 24 is free from projections or unevenness. In contrast, exterior surface 26 of main pipe member 12 includes first and second spiral fastening sections 28, 30, which may be male-threaded fastening sections, as shown in FIG. 13. As previously stated, first and second spiral male-threaded fastening sections 28, 30 mechanically couple with a corresponding complementary spiral female-threaded sections of conventional drainpipe locking rings or collars. In an embodiment, fastening sections 28, 30 may be any fastening means, such that main pipe member 12 is mechanically coupled with a corresponding complementary fastening section of conventional drainpipe locking rings or collars.

Piston-Valve Housing

Figure 14:
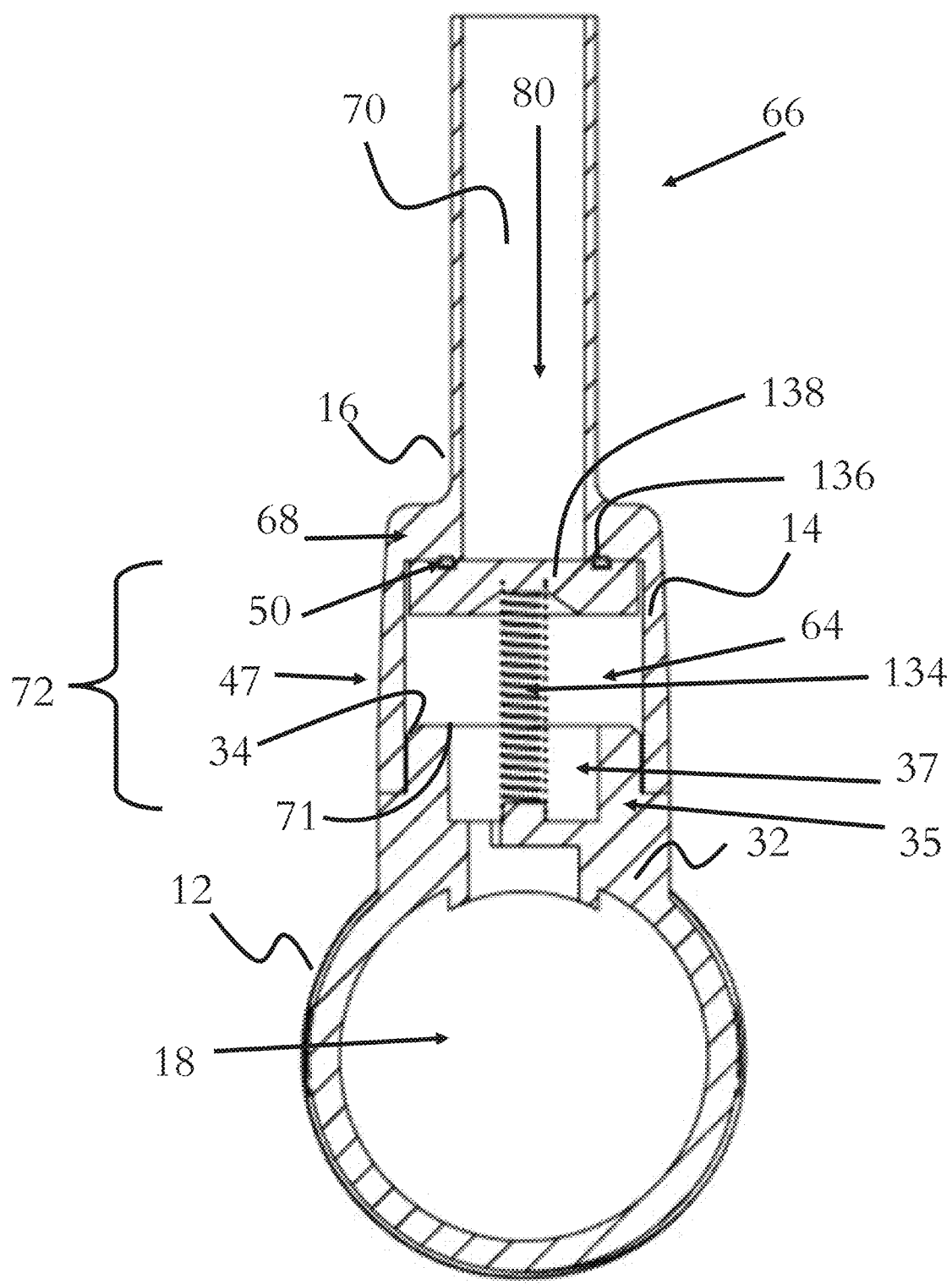
FIG. 14 is a cross-sectional view of an embodiment of the pipe connector apparatus of FIG. 13 along line A-A according to embodiments of the present disclosure.

FIG. 14 depicts, in some embodiments, valve assembly 72 regulating the fluid flow between riser 16 and central passage 18 of main pipe member 12. In some embodiments, the regulation of the fluid flow may be achieved by transitioning rigid (or stopper) portion 138 between a closed position and an open position. In some embodiments, flange gasket 136 is provided on rigid portion 138 and is spaced apart from biasing component 134. Flange gasket 136 is sized to enable rigid portion 138 to abut and press-fit into floor member 50. By doing so, valve assembly 72 is locked in place and supported by floor member 50 in the closed position, as shown in FIG. 14.

Figure 15:
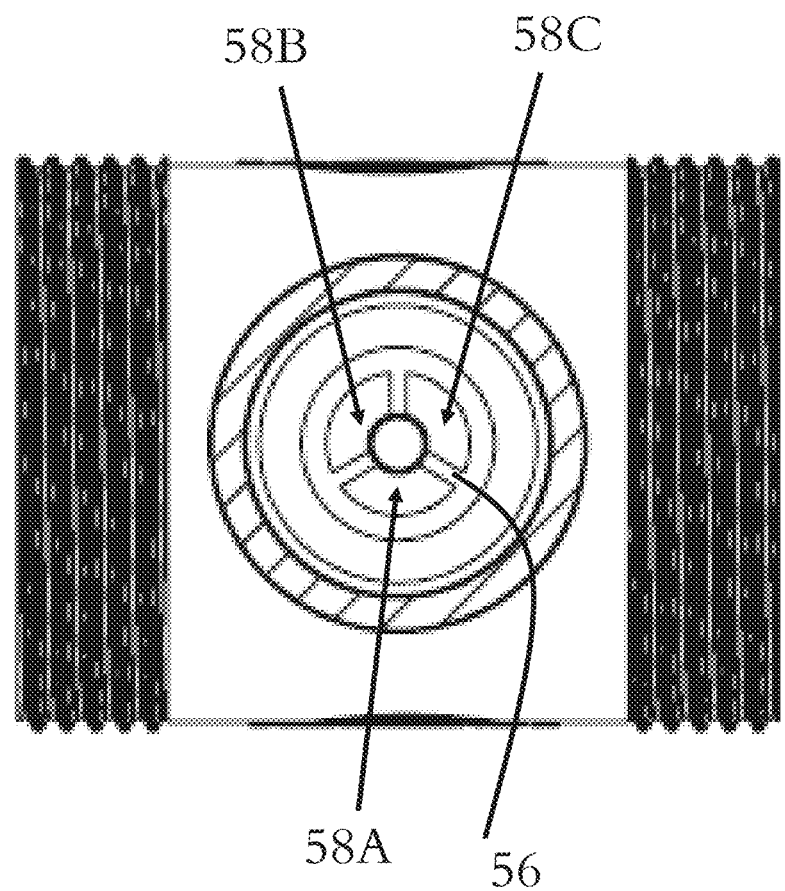
FIG. 15 is a top cross-sectional view of an embodiment of the pipe connector apparatus of FIG. 14 according to embodiments of the present disclosure.

As shown in FIG. 14, in some embodiments, valve assembly 72 may be biased toward the closed position, such that rigid portion 138 may abut floor member 50. Accordingly, when valve assembly 72 is in the closed position, the nature of flange gasket 136 may completely seal off passages 58A, 58B, and 58C as shown in FIG. 15, from being in communication with cavity 64. Thus, the backflow of any fluid back into riser 16 may be prevented.

Figure 16:
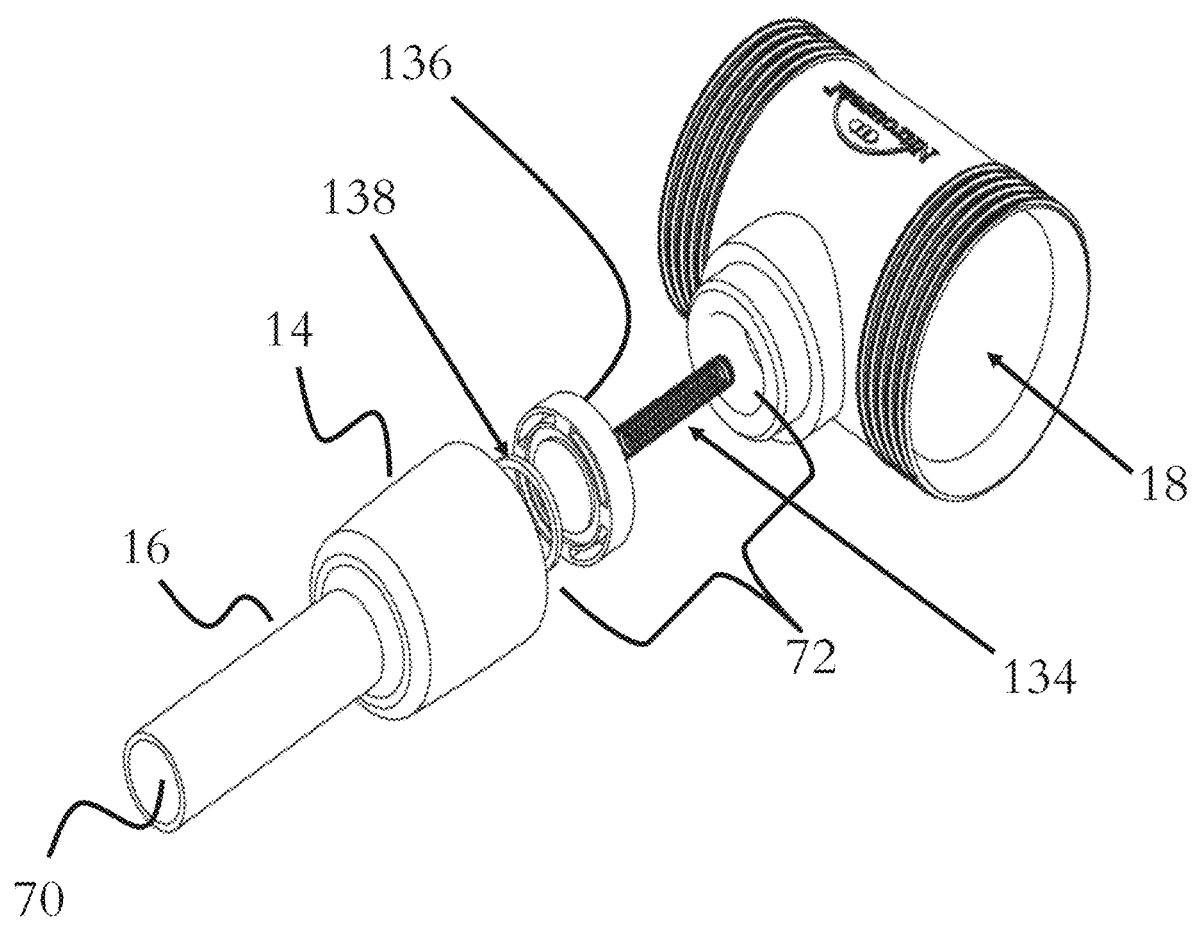
FIG. 16 is an exploded assembly view of an embodiment of the pipe connector apparatus of the present invention according to embodiments of the present disclosure.

As shown in FIGS. 14-16, in some embodiments, when rigid portion 138 is acted upon by the force of a fluid (such as flowing gas from a medical gas scavenging device) traveling through central passage 70 of riser 16, the force may act upon biasing component 134, whereby biasing component 134 may be compressed and rigid portion 138 translates opposite the floor member 50 and assumes the open position. As shown in FIGS. 14-15, at least one rib 56 extends radially between bottom end edge 68 forming passages 58A, 58B, and 58C (collectively referred to as passages 58) As depicted in FIGS. 14-15, in such open positions, any gas or other fluid flowing through riser 16 may continue to flow as indicated by arrow 80 through passages 58. In some embodiments, the fluid then may flow into cavity 64 and through passageway 37. In some embodiments, the fluid may exit into central passage 18 of main pipe member 12, where the fluid can be safely discharged into the building's waste-collection system.

Thus, in some embodiments, by providing valve assembly 72 in accordance with the present invention, the pipe connector apparatus 10 of FIGS. 13-16 may be capable only of uni-directional exhaust flow. Accordingly, any backflow of an undesirable fluid (e.g., sewer gas) into the treatment room or area that may emanate from the building's waste-collection system to which pipe connector apparatus 10 is connected may be eliminated by the present invention.

Figure 17:
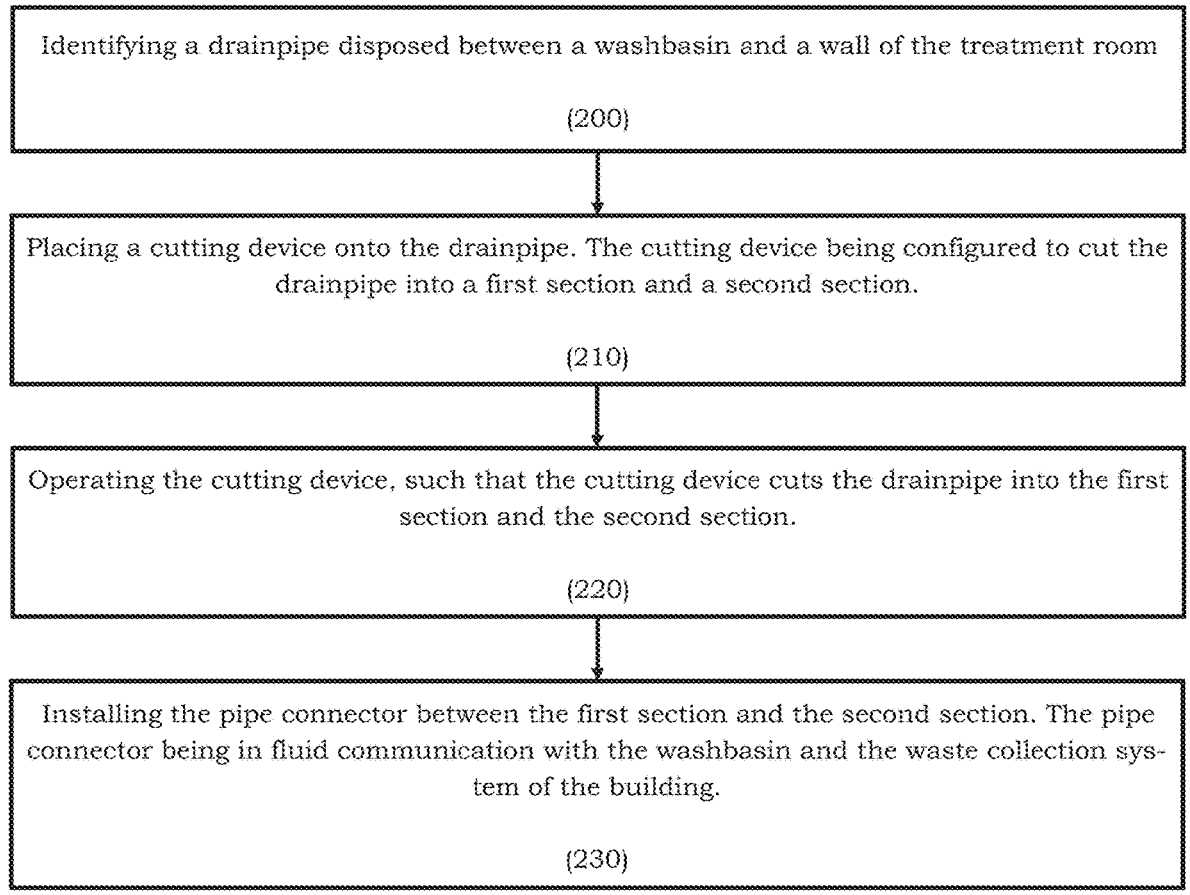
FIG. 17 is a flow chart depicting the steps of a method of evacuating a medical waste gas from a treatment room within a building.

Referring now to FIG. 17, in conjunction with FIGS. 1-16, an exemplary process flow diagram is provided, depicting a method for the removal of a medical waste gas from within a treatment room. The steps delineated in the exemplary process flow diagram of FIG. 17 are merely exemplary of a preferred order for the removal of a medical waste gas from a treatment room. The steps may be carried out in another order, with or without additional steps including therein. Additionally, the steps may be carried out with an alternative embodiment of pipe connection apparatus 10, as contemplated in the above description.

The method for the removal (or evacuation) of a medical gas from a treatment room of a building begins at step 200, during which a drainpipe disposed between a washbasin and a wall of the treatment room is identified. At step 210, a cutting device is placed onto the drainpipe. The cutting device being configured to cut the drainpipe into a first section and a second section. At step 220, the cutting device is operated, such that the drainpipe is cut into the first section and the second section. Next, the pipe connector apparatus is installed between the first section and the second section at step 230. Specifically, at step 240, a second trap end of a plumbing trap is coupled to a first member end of the pipe connector. The plumbing trap includes a first trap end opposite a second trap end, where the first trap end is coupled to a washbasin. The pipe connection apparatus includes the components discussed above. The method then proceeds to step 250, in which the second member end of the pipe connector is coupled to a drainpipe. The drainpipe being in fluid communication with a waste collection system of the building. In step 260, an exhaust hose in fluid communication is coupled with a medical gas scavenging device to the distal end of the valve housing. In step 270, an amount of the medical waste gas emitted by the medical gas scavenging device is transferred, via the exhaust hose, into the pipe connector. Next, at step 280, the amount of the medical waste gas is exhausted, via the drainpipe, into the waste collection system of the building.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A pipe-connector assembly system for exhausting a waste gas from an interior environment of a building, the system comprising:
   a pipe connector apparatus including a main pipe member extending between a first member end and a second member end;
   an exhaust hose fluidically coupled to the pipe connector apparatus between the first member end and the second member end thereof, the exhaust hose configured to exhaust an amount of the waste gas from the interior environment; and
   a drainpipe having a first end coupled to the second member end of the pipe connector apparatus and a second end coupled to a waste collection system of the building,
   wherein the amount of the waste gas flows from the exhaust hose through the pipe connector apparatus and into the waste collection system of the building, such that the amount of the waste gas is safely evacuated from the interior environment.

2. The pipe-connector assembly system of claim 1, further comprising:
   a quick-release valve having an inlet, an output, and a passage extending between the inlet and the output;
   the inlet configured to be removably coupled to the exhaust hose; and
   the output coupled to the pipe connector apparatus between the first member end and the second member end thereof,
   wherein the amount of the waste gas flows from the exhaust hose through the quick-release valve to the pipe connector apparatus and is exhausted into the waste collection system of the building.

3. The pipe-connector assembly system of claim 1, further comprising:
   an intermediary riser disposed between the pipe connector apparatus and the exhaust hose, the intermediary riser including:
     a body defining a bore extending between a first riser end fluidically coupled to the pipe connector apparatus and a second riser end fluidically coupled to the exhaust hose.

4. The pipe-connector assembly system of claim 1, further comprising:
   a plumbing trap, having a first trap end and a second trap end, wherein the first trap end is connected to a washbasin disposed within the interior environment, and wherein the second trap end is connected to the first member end of the pipe connector apparatus.

5. The pipe-connector assembly system of claim 4, further comprising:
   a first attachment mechanism disposed at the first member end and configured to threadedly engage with a second attachment mechanism disposed at the second trap end of the plumbing trap;
   a third attachment mechanism disposed at the second member end and configured to threadedly engage with the first end of the drainpipe;
   wherein the pipe connector apparatus is secured between the plumbing trap and the drainpipe.

6. The pipe-connector assembly system of claim 1, further comprising:
   a one-way valve disposed between and in fluidic communication with each of the pipe connector apparatus and the exhaust hose, wherein the one-way valve is configured to prevent a backflow of the amount of the waste gas from the waste collection system back into the internal environment.

7. The pipe-connector assembly system of claim 6, further comprising:
   a valve housing including a proximal end and an opposing distal end, the proximal end connected to the pipe connector apparatus between the first member end and the second member end thereof, and the distal end connected to the exhaust hose, wherein the valve resides within the valve housing between the proximal end and the distal end thereof.

8. The pipe-connector assembly system of claim 7, wherein the valve further comprises:
   a closed position and an open position, wherein the open position permits the amount of the waste gas to flow through the valve housing from the internal environment to the waste collection system of the building and the closed position prevents the backflow of the amount of the waste gas from the waste collection system back into the internal environment;
   a biasing component applying a biasing force on a rigid portion towards the closed position;
   whereby the rigid portion is translatable between the closed position and the open position when an external force, emanating through the exhaust hose, overcomes the biasing force.

9. The pipe-connector assembly system of claim 1, further comprising:
   a gas scavenger device coupled to the exhaust hose, the gas scavenger device configured to exhaust the amount of the waste gas from the interior environment via the exhaust hose.

10. A pipe-connector assembly system for exhausting a medical waste gas from a treatment room within a building, the system comprising:
    a plumbing trap having a first trap end and a second trap end, wherein the first trap end is connected to a washbasin disposed within the interior environment;
    a pipe connector apparatus including a main pipe member extending between a first member end and a second member end, the first member end coupled to the second trap end of the plumbing trap;
    a medical gas scavenger device fluidically coupled to the pipe connector apparatus between the first member end and the second member end thereof, the medical gas scavenger device configured to exhaust an amount of the medical waste gas from the interior environment; and
    a drainpipe having a first end coupled to the second member end of the pipe connector apparatus and a second end coupled to a waste collection system of the building,
    wherein the amount of the medical waste gas flows from the medical gas scavenger device through the pipe connector apparatus and into the waste collection system of the building, such that the amount of the medical waste gas is safely evacuated from the treatment room.

11. The pipe-connector assembly system of claim 10, further comprising:
    a quick-release valve having an inlet, an output, and a passage extending between the inlet and the output;

the inlet configured to be removably coupled to an exhaust hose of the medical gas scavenger device; and the output coupled to the pipe connector apparatus between the first member end and the second member end thereof, wherein the amount of the medical waste gas flows from the medical gas scavenger device through the quick-release valve to the pipe connector apparatus and exhausted into the waste collection system of the building.

12. The pipe-connector assembly system of claim 10, further comprising:

an intermediary riser disposed between the pipe connector apparatus and the medical gas scavenger device, the intermediate riser including:

a body defining a bore extending between a first riser end fluidically coupled to the pipe connector apparatus and a second riser end fluidically coupled to an exhaust hose of the medical gas scavenger device.

13. The pipe-connector assembly system of claim 10, further comprising:

a first attachment mechanism disposed at the first member end and configured to threadedly engage with a second attachment mechanism disposed at the second trap end of the plumbing trap;

a third attachment mechanism disposed at the second member end and configured to threadedly engage with the first end of the drainpipe;

wherein the pipe connector apparatus is secured between the plumbing trap and the drainpipe.

14. The pipe-connector assembly system of claim 10, further comprising:

a one-way valve disposed between and in fluidic communication with each of the pipe connector apparatus and the medical gas scavenger device, wherein the one-way valve is configured to prevent a backflow of the amount of the medical waste gas from the waste collection system back into the internal environment.

15. The pipe-connector assembly system of claim 14, further comprising:

a valve housing including a proximal end and an opposing distal end, the proximal end connected to the pipe connector apparatus between the first member end and the second member end thereof, and the distal end connected to the medical gas scavenger device, wherein the valve resides within the valve housing between the proximal end and the distal end thereof.

16. The pipe-connector assembly system of claim 15, wherein the valve further comprises:

a closed position and an open position, wherein the open position permits the amount of the medical waste gas to flow through the valve housing from the internal environment to the waste collection system of the building and the closed position prevents the backflow of the amount of the medical waste gas from the waste collection system back into the internal environment;

a biasing component applying a biasing force on a rigid portion towards the closed position;

whereby the rigid portion is translatable between the closed position and the open position when an external force, emanating from the medical gas scavenger device, overcomes the biasing force.

17. The pipe-connector assembly system of claim 15, wherein the valve housing further comprises:

an interior wall extending between the proximal end and the distal end, the interior wall defining a channel therein;

a support floor member disposed within the channel, the support floor member including a central hub defining a central valve-step support aperture and a rib extending radially between the central hub and the interior wall of the channel.

18. A method of exhausting a medical waste gas scavenged by a medical gas scavenging device from a treatment room in a building, the method comprising:

coupling a second member end of a pipe connector apparatus to a drainpipe, the drainpipe fluidically coupled to a waste collection system of the building, the pipe connector apparatus including a second member end opposite the first member end and a main pipe member extending between the first member end and the second member end;

coupling an exhaust hose fluidically coupled to the medical gas scavenging device to the pipe connector apparatus between the first member end and the second member end;

collecting, via the medical gas scavenging device, an amount of the medical waste gas from the treatment room;

transferring, via the exhaust hose, the amount of the medical waste gas into the pipe connector apparatus; and exhausting, via the drainpipe, the amount of the medical waste gas into the waste collection system of the building.

19. The method of exhausting the medical waste gas of claim 18, further comprising the steps of:

providing a quick release valve having an inlet, an output, and a passage extending between the inlet and the output;

coupling the inlet to the exhaust hose of the medical gas scavenger device;

coupling the output to the pipe connector apparatus; and transferring, via the quick-release valve, the medical waste gas from the medical gas scavenging device to the pipe connector apparatus.

20. The method of exhausting the medical waste gas of claim 18, further comprising the steps of:

prior to the step of coupling the second member end of the pipe connector apparatus to the drainpipe, cutting the drainpipe into a first section and the second section and installing the pipe connector apparatus between the first section and the second section, such that the first member end of the pipe connector apparatus connects to the first section, and such that the second member end of the pipe connector apparatus connects to the second section.

21. The pipe-connector assembly system of claim 1, wherein the waste gas includes nitrous oxide, oxygen, or a combination of nitrous oxide and oxygen.

22. The pipe-connector assembly system of claim 10, wherein the waste gas includes nitrous oxide, oxygen, or a combination of nitrous oxide and oxygen.

23. The method of exhausting the medical waste gas of claim 18, wherein the waste gas includes nitrous oxide, oxygen, or a combination of nitrous oxide and oxygen.

* * * * *